US012685294B2

(12) United States Patent (10) Patent No.: US 12,685,294 B2

Morris et al. (45) Date of Patent: Jul. 21, 2026

(54) SYSTEMS AND METHODS FOR RESTRAINT-FREE ANIMAL POSITIONER

(71) Applicant: Mars, Incorporated, McLean, VA (US)

(72) Inventors: Kathryn June Morris, Melton (GB); Debra Samuels, Colsterworth (GB)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 18/725,339

(22) PCT Filed: Dec. 20, 2022

(86) PCT No.: PCT/US2022/082014

§ 371 (c)(1),
(2) Date: Jun. 28, 2024

(87) PCT Pub. No.: WO2023/129837

PCT Pub. Date: Jul. 6, 2023

(65) Prior Publication Data

US 2025/0107508 A1 Apr. 3, 2025

Related U.S. Application Data

(60) Provisional application No. 63/295,083, filed on Dec. 30, 2021.

(51) Int. Cl.
| | |
|---|---|
| *A01K 13/00* | (2006.01) |
| *A01K 15/04* | (2006.01) |
| *A61D 3/00* | (2006.01) |

(52) U.S. Cl.
CPC ............ *A01K 13/001* (2013.01); *A01K 15/04* (2013.01); *A61D 3/00* (2013.01)

(58) Field of Classification Search
CPC ......... A01K 15/04; A01K 13/001; A61D 3/00
See application file for complete search history.

(56) References Cited

U.S. PATENT DOCUMENTS 2,773,477 A * 12/1956 Michael ................... A61D 3/00
248/287.1
2,804,845 A * 9/1957 Plumley .................. A61D 3/00
119/756

(Continued)

FOREIGN PATENT DOCUMENTS

CN 112823617 A 5/2021
KR 20200001821 U 8/2020

OTHER PUBLICATIONS

International Search Report and Written Opinion issued in International Application No. PCT/US2022/082014 dated Mar. 29, 2023 (15 pages).

*Primary Examiner* — Joshua D Huson
*Assistant Examiner* — Edgar Reyes
(74) *Attorney, Agent, or Firm* — Bookoff McAndrews, PLLC

(57) ABSTRACT

Systems, methods, and devices for confining pet movement without physical restraint are disclosed herein. The systems and devices may include a first stand including an adjustable body support, a first middle portion, and a first base portion, the first middle portion configured to move the adjustable body support vertically based on a height of a pet; a second stand including an adjustable platform, a second middle portion, and a second base portion, the second middle portion configured to move the adjustable platform vertically based on the height of the pet, the adjustable platform configured to retain an item that is placed on a first surface of the adjustable platform; and a base onto which the first stand and the second stand are mounted.

20 Claims, 7 Drawing Sheets

(56)  References Cited

U.S. PATENT DOCUMENTS

| | | | |
|---|---|---|---|
| 3,120,836 A * | 2/1964 | Brauning ................. | A61D 3/00 |
| | | | 269/329 |
| 3,524,434 A * | 8/1970 | Finley ...................... | A61D 3/00 |
| | | | 119/756 |
| 4,003,341 A | 1/1977 | La Croix | |
| 4,860,689 A | 8/1989 | Stewart | |
| 5,943,983 A * | 8/1999 | Drew ....................... | A61D 3/00 |
| | | | 119/722 |
| 2007/0079766 A1 * | 4/2007 | Park ....................... | A61D 11/00 |
| | | | 119/674 |
| 2018/0325081 A1 | 11/2018 | Lee et al. | |
| 2019/0239482 A1 | 8/2019 | Gallagher | |
| 2021/0259212 A1 * | 8/2021 | Meneou, II ......... | A01K 27/003 |
| 2023/0064379 A1 * | 3/2023 | Helms ................... | A01K 15/04 |

* cited by examiner

SYSTEMS AND METHODS FOR RESTRAINT-FREE ANIMAL POSITIONER

CROSS-REFERENCE TO RELATED APPLICATION

This is a National Stage Application under 35 U.S.C. § 371 of International Application No. PCT/US2022/082014, filed on Dec. 20, 2022, which claims the benefit of priority to U.S. Provisional Patent Application No. 63/295,083, filed on Dec. 30, 2021, the entireties of which are incorporated herein by reference.

TECHNICAL FIELD

Various embodiments of the present disclosure relate generally to systems, methods, and devices for confining animal movement and, more particularly, to systems, methods, and devices for confining pet movement without physical restraint.

BACKGROUND

A variety of systems, methods, and devices exist for restraining or controlling animal movement. An animal, such as a companion animal or pet, may require restraint to limit or prevent movement during various procedures performed on the animal. Such procedures that require limited movement include examination, treatment, and grooming. Even the simplest pet care and maintenance procedures (e.g., nail/claw clipping) may be difficult for pet owners to perform on pets, often requiring veterinarian assistance, due to the inability to control pet movement.

A common technique for restraining an animal is the use of physical restraint. Examples of physical restraint include devices or articles such as harnesses, leashes, loops to positon and keep an animal in place, anchoring devices, straps, towels, and restraint bags. Many of these devices and physical restraint systems may lead to harmful effects on animals, which can be attributed to factors such as injury from struggle, choking, and suffocating. Physical restraint systems and methods create a stressful environment for animals already undergoing uncomfortable and restrictive procedures. Pets may also be required to remain in a standing position for an extended amount of time due to the procedures taking longer than necessary, which may be attributable to the physical restraint.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, methods, and devices are disclosed for confining pet movement without the use of or need for physical restraint of the pet. The systems, methods, and devices of the disclosure provide non-restrictive means for placing a pet in a standing position and allowing the pet to interact with an item that engages the pet's attention, while the pet remains in the standing position.

In one aspect, an exemplary system for confining pet movement without physical restraint may include a first stand, a second stand, and a base onto which the first stand and the second stand are mounted. The first stand may include an adjustable body support, a first middle portion, and a first base. The first middle portion may be configured to move the adjustable body support vertically based on a height of a pet. The second stand may include an adjustable platform, a second middle portion, and a second base portion. The second middle portion may be configured to move the adjustable platform vertically based on the height of the pet. The adjustable platform may be configured to retain an item that is placed on a first surface of the adjustable platform. In some examples, the item may include a toy, an electronic device, food, a feeding substrate, or a combination thereof.

In another aspect, an exemplary device for confining pet movement without physical restraint may include a base, a first stand connected to the base, and a second stand connected to the base. The first stand may include a first base portion that connects the first stand to the base and a body support portion configured to be positioned between the fore and hind legs of a pet in a standing position. The second stand may include a second base portion that connects the second stand to the base of the device and a platform configured to hold an item that engages attention of the pet.

In yet another aspect, an exemplary method for confining pet movement without physical restraint may include the following: positioning a platform of a first stand relative to a pet; placing an item that engages the pet's attention on the platform; allowing the pet to engage with the item; and positioning a body support of a second stand between the fore legs and hind legs of the pet.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1A:
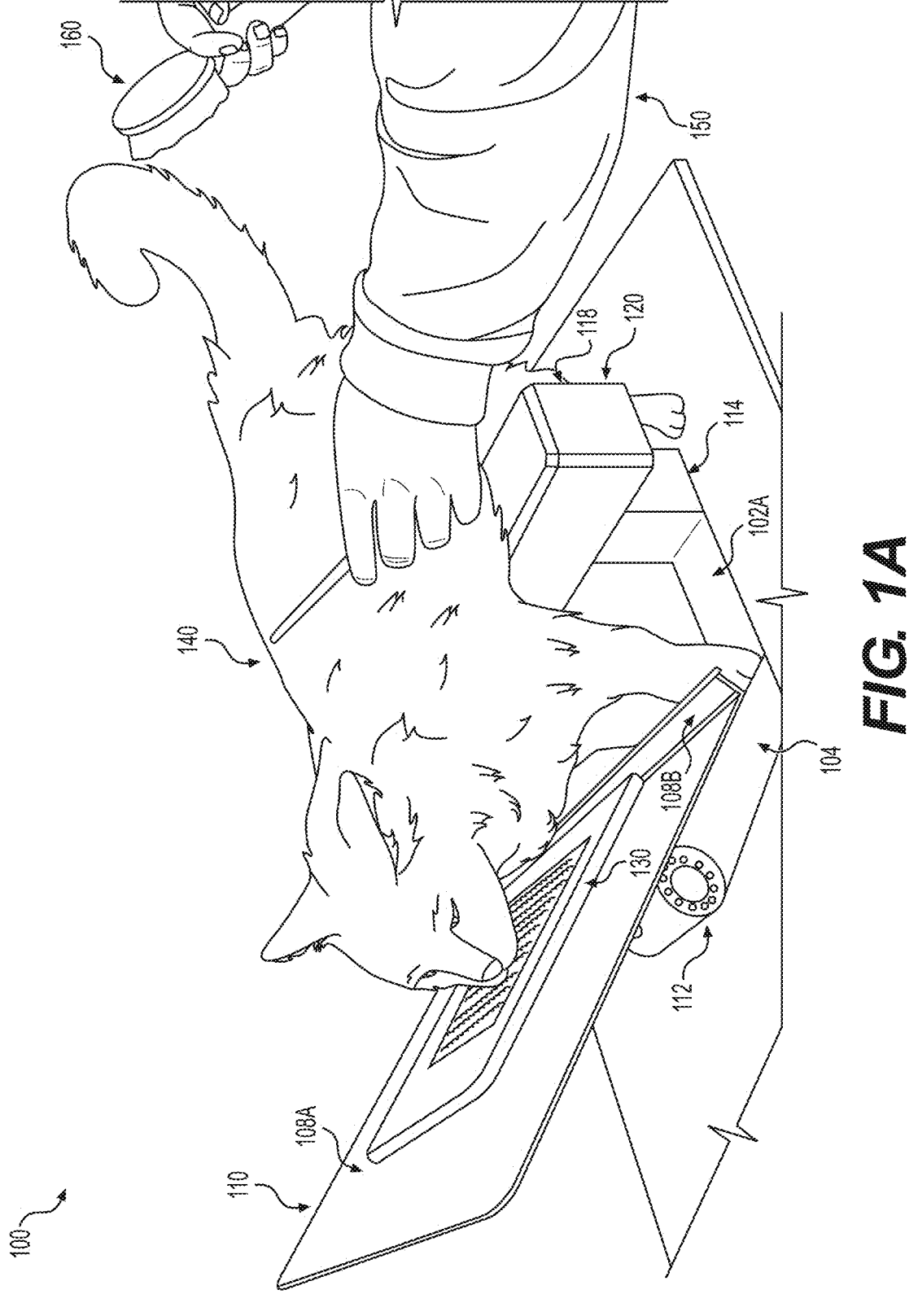
FIGS. 1A-1C depict exemplary scenarios and embodiments in which one exemplary system for confining pet movement without physical restraint and other aspects of the present disclosure may be used.

Various embodiments of the present disclosure relate generally to systems, methods, and devices for confining animal movement and, more particularly, to systems, methods, and devices for confining pet movement without physical restraint.

As discussed above, a variety of techniques and devices are used to confine animal movement. In particular, it is desirable to confine the movement of companion animals and household pets, such as cats and dogs, in order to perform veterinarian procedures and grooming procedures. In some examination and grooming procedures, it may also be necessary for a pet to remain in a standing position. During such procedures, it is natural for a pet to attempt moving around, sitting, and/or acts of resistance. As a result, pet owners often experience difficulty conducting basic pet care procedures on pets and seek veterinarian assistance, which detracts from more serious procedures. Current systems, methods, and devices for positioning a pet and limiting or restricting the pet's movement often utilize some type of physical restraint. Physical restraint may create a harmful, stressful, and scary environment for pets as a result of feelings of constriction and discomfort.

Thus, a need exists for systems and methods for confining pet movement without physical restraint which causes distress, wherein the systems and methods are capable of use by pet owners, pet care providers (e.g., pet groomers), and veterinarians and veterinary technicians. Systems, methods, and devices disclosed herein allow for confinement of pet movement without physical restraint and thus provide a remedy to the above-mentioned issues. For example, embodiments of the present disclosure are directed to non-physically restrictive systems, devices, and methods for controlling and/or limiting pet movement, which allows a human to perform various procedures on a pet that would normally require physical restraint. The present disclosure is directed to standing, positioning, and engagement systems, which provide the pet with a sense of autonomy.

The systems and devices disclosed herein may comprise a first stand comprising a body support, a second stand comprising a platform configured to hold an item that engages attention of the pet, and a base onto which the first and second stand may be mounted. In some embodiments, the body support and the platform configured to hold an item are each adjustable vertically based on a height of the pet. The item that may be retained on the platform may include a toy, an electronic device, food, a feeding substrate, or a combination thereof. Such configurations allow for a pet to engage directly with an item placed on a platform before the pet and also allow for the body of the pet to be supported in a standing position while the pet actively engages with the item, by positioning the first stand comprising the body support between the fore and hind legs of a pet in a standing position.

Rather than having to physically restrain a pet, the systems and devices of the present disclosure encourage a pet to remain in position (i.e., standing position) with limited movement while a human performs a procedure on the pet, by occupying the pet's attention and serving as a stimulating distraction. Because the pet's attention is engaged with entertainment items and/or food, the embodiments of the present disclosure facilitate a calming, low stress environment for the pet, which make it easier to perform various pet care procedures. Various embodiments disclosed herein also enable the adjustment of the platform as well as the positioning of the first stand and/or second stand relative to the base in order to better accommodate the pet. Such capabilities further contribute to a relaxed and comfortable experience for the pet. In addition, the systems and devices of the disclosure are not only capable of use by veterinarians and pet care professionals, but also by pet owners, because the embodiments disclosed herein incorporate items readily available within the home.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In the detailed description herein, references to "embodiment," "an embodiment," "one non-limiting embodiment," "in various embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In general, terminology can be understood at least in part from usage in context. For example, terms, such as "and", "or", or "and/or," as used herein can include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

As used herein, the terms "comprises," "comprising," "includes," "including," or any other variation thereof, are intended to cover a non-exclusive inclusion, such that a process, method, article, or apparatus that comprises a list of elements does not include only those elements but can include other elements not expressly listed or inherent to such process, method, article, or apparatus.

Further, the terms "first," "second," and the like, herein do not denote any order, quantity, or importance, but rather are used to distinguish one element from another. Similarly, terms of relative orientation, such as "top," "bottom," "front," "back," etc. are used with reference to the orientation of the structure illustrated in the figures being described. It should also be noted that all numeric values disclosed herein may have a variation of ±10% (unless a different variation is specified) from the disclosed numeric value. Further, all relative terms such as "about," "substantially,"

"approximately," etc. are used to indicate a possible variation of +10% (unless noted otherwise or another variation is specified).

The terms "animal" and "pet" or variations thereof, as used in accordance with the present disclosure can refer to, without limitation, domesticated or tamed animals such as, e.g., dogs, cats, hamsters, rabbits, pigs, goats, horses, and the like. Domestic dogs and cats are particular non-limiting examples of pets. Further, "companion animal" can refer to any animal which a human regards as a pet.

The term "pet owner" may include, for example, without limitation, any person, organization, and/or collection of persons that owns and/or provides food and shelter for a pet. For example, a "pet owner" may include a pet adopter, a pet caretaker, a pet caregiver, and an animal shelter.

The term "veterinarian" may include, for example, without limitation, any person, organization, and/or collection of persons that provides medical care to a pet. For example, a "veterinarian" may include a veterinary technician, a veterinary personnel, and a veterinarian practitioner.

The term "pet care provider" may include, for example, without limitation, any person, organization, and/or collection of persons that oversee an aspect of a pet's wellbeing while the pet is in their care. For example, a "pet care provider" may include a pet groomer, a pet bather, a pet sitter, a pet trainer, and a pet daycare.

As used herein, the term "cat" refers to domestic cats, in particular *Felis domesticus* (*Felis catus*).

As used herein, the term "dog" refers to domestic dogs, in particular *Canis lupus familiaris*.

The term "electronic device" may include, for example, without limitation, any electronic equipment that is interactive and can be used for entertainment and viewing purposes. An electronic device as used in the present disclosure may include: a mobile computer (e.g., a tablet computer (tablet), a laptop computer, or a netbook computer), a portable television, a portable DVD player, a touchscreen display, a smartphone, and the like.

Figure 1B:
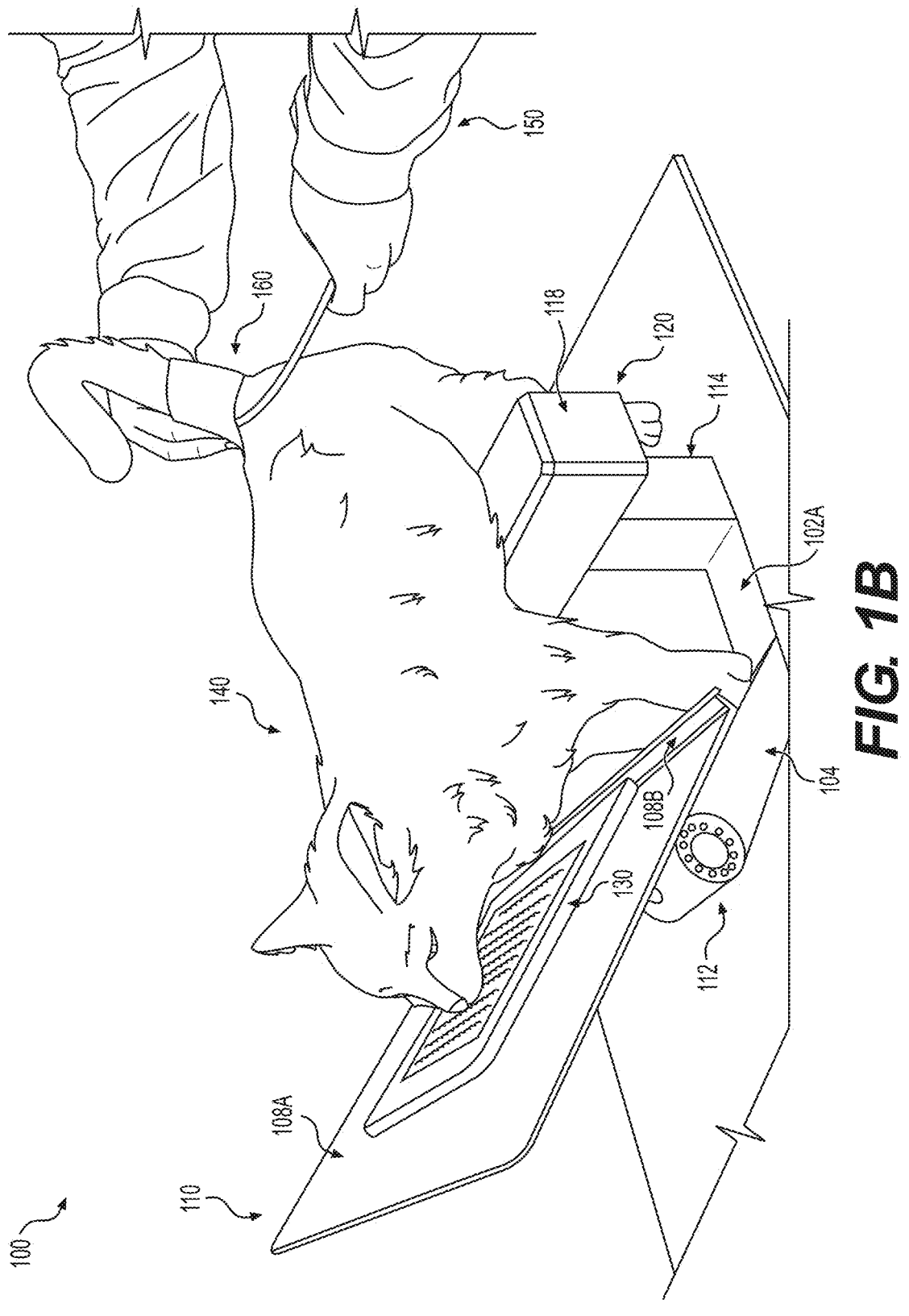
Figure 1C:
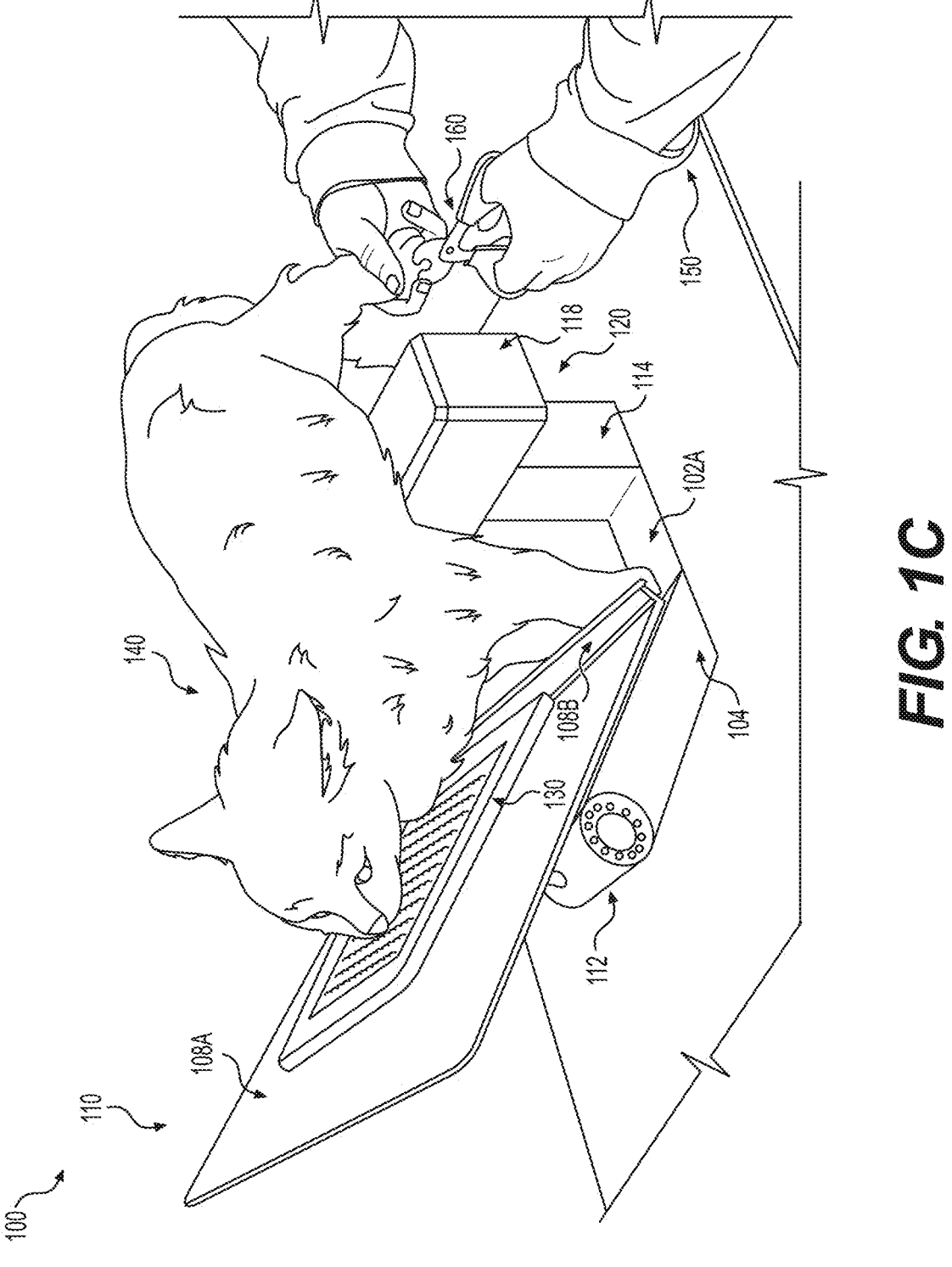

Referring now to the appended drawings, FIGS. 1A-1C depict an exemplary system 100 for confining pet movement without physical restraint. FIGS. 1A, 1B, and 1C, depict different scenarios in which system 100 according to at least one aspect of the disclosure may be used. System 100 represents one of many systems and/or devices according to the present disclosure. For the purposes of the present disclosure, systems and devices may be referred to interchangeably. A detailed description of other systems and devices for confining pet movement without physical restraint is provided further below in reference to FIGS. 3A-3C.

In FIGS. 1A-1C, system 100 includes a first stand 120, a second stand 110, and a base 102A. First stand 120 and second stand 110 are each connected or mounted to base 102A. First stand 120, second stand 110, and base 102A form a unitary device. First stand 120 includes a body support 118 and a first base portion 114. First base portion 114 connects first stand 120 to base 102A. Second stand 110 includes a platform 108A, an item support portion 108B, a second base portion 104, and an adjustment mechanism 112. Second base portion 104 connects second stand 110 to base 102A. While the second base portion 104 of second stand 110 is depicted as being angled in a direction away from pet 140 (e.g., tilted backwards) in FIGS. 1A-1C, in some embodiments, second base portion 104 may be positioned upright forming a perpendicular angle with base 102A. In other words, second base portion 104 may be configured to stand straight up when pet 140 engages with second stand 110.

Item support portion 108B projects outward from platform 108A and a perpendicular angle is formed between item support portion 108B and platform 108A. Item support portion 108B extends across the entire length of the bottom portion of platform 108A and supports item 130. Platform 108A and item support portion 108B retain item 130, which is placed on platform 108A and supported by item support portion 108B, extending underneath. Second stand 110 is oriented so that pet 140 can interface with the item 130 retained on platform 108A. In system 100, adjustment mechanism 112 may be a hinge mechanism. Adjustment mechanism 112 (e.g., hinge mechanism) is connected to platform 108A at the back surface and allows rotation of platform 108A to better align with pet 140 for pet interaction with item 130. An angle or axis of rotation may also be shown at or near adjustment mechanism 112.

As pet 140 engages with item 130, body support 118 of first stand 120 is positioned between the fore and hind legs of pet 140, while pet 140 is in a standing position. Body support 118 is positioned underneath pet 140 and separates the fore legs and hind legs of pet 140, providing constant support of the body and helping to maintain the standing position. Each of FIGS. 1A-1C illustrates that pet 140 in system 100 is in a relatively stationary position. In other words, system 100 confines the movement of pet 140 without physical restraint.

FIGS. 1A-1C illustrate different scenarios in which system 100 may be used. FIG. 1A includes system 100 as described above, pet 140, and human 150. As pet 140 engages with item 130 on second stand 110 and is supported in a standing position by first stand 120, a human 150 performs a procedure 160 on pet 140. Similarly, in FIG. 1B and FIG. 1C, a human 150 performs a procedure 160 on pet 140, as pet 140 engages with item 130 on second stand 110 and is supported in a standing position by first stand 120. In FIG. 1A, procedure 160 includes brushing and combing the hair of pet 140. In FIG. 1B, procedure 160 includes measuring the blood pressure of pet 140. In FIG. 1C, procedure 160 includes clipping the nails of pet 140.

While FIGS. 1A-1C depict certain procedures for procedure 160, the systems, methods, and devices for confining pet movement without physical restraint of the disclosure may be used in a variety of procedures. For example, the systems, methods, and devices as disclosed herein are capable of being used in procedures, such as health related procedures and grooming procedures. Exemplary health related procedures, which may be performed in accordance with embodiments of the disclosure include, but are not limited to, blood pressure measurement, treating skin lesions, examining pet skin, and administering an injection. For example, system 100 may be used to engage a pet's attention and restrict their movement while a vaccination or shot is being administered. Most of the health related procedures such as various medical treatments and examinations may be performed by a veterinarian. For example, in FIG. 1B, human 150 performing the procedure 160 of measuring the blood pressure of pet 140, may be a veterinarian. In some embodiments, certain health related procedures may be performed by a pet owner or a pet care provider. For example, a pet owner may use systems, methods, and devices of the disclosure to confine pet movement while examining their pet's skin to check for ticks or fleas.

Examples of grooming procedures, which may be performed in accordance with embodiments of the disclosure, include nail trimming, hair trimming, hair brushing and/or combing, and paw cleaning. Systems and devices of the present disclosure are intended to be used by a variety of persons including, but not limited to, veterinarians, pet owners, and pet care providers. In some embodiments, a pet owner may use systems and devices disclosed herein to confine movement of their pet while performing a grooming procedure at home. For example, in FIG. 1C, human 150 performing the procedure 160 of nail trimming on pet 140, may be a pet owner. In other embodiments, systems and devices of the disclosure may be used by pet care providers at grooming facilities. For example, in FIG. 1A, human 150 performing the procedure 160 of hair brushing and combing on pet 140, may be a pet groomer.

In system 100, as depicted in FIGS. 1A-1C, pet 140 is a cat. Similarly, in embodiments throughout the disclosure, the systems, devices, and methods disclosed herein may be used with a cat, to confine the movement and maintain the cat's standing position. In some embodiments, the pet may be a small dog. Examples of small dog breeds may include, for example, without limitation, beagle, cairn terrier, chihuahua, dachshund, King Charles spaniel, pomeranian, poodle, pug, Scottish terrier, shih tzu, English cocker spaniel, and Yorkshire terrier. The systems, devices, and methods for confining pet movement without physical restraint are not limited to cats, small dogs, or other small pets, and may also be used for confining movement of various types of pets having fore and hind legs, between which the first stand 120 may be positioned.

FIGS. 1A-1C also depict that item 130 retained on platform 108A of the second stand 110 in system 100, is a feeding mat that pet 140 licks. Any suitable feeding substrate, such as substrates having a planar surface may be used as the item that the pet engages with in systems and devices of the present disclosure. For example, a suitable feeding substrate may include feeding mats, feeding platters, slabs, trays, and the like. Feeding substrates, such as the feeding substrate in FIGS. 1A-1C, may include a mat or flat base comprising a substantially textured surface. The surface of the feeding substrate may include raised patterns and may also contain crevices or indentations therein for retaining food. As shown in FIGS. 1A-1C, pet 140 may engage with the feeding substrate by licking and running its tongue across the surface for food.

According to embodiments of the disclosure, the item retained on the platform of the second stand, may be any item that engages a pet's attention. The item may be portable and capable of being retained by a platform as described herein. In some examples, the item that engages pet attention may be a toy or an electronic device. Examples of toys that may be used as the item that engages a pet's attention include puzzles and interactive games. Examples of electronic devices that may be used as the item that engages a pet's attention include tablets, electronic games, a touchscreen display, and a portable television or DVD player. Further, as an alternative to using the feeding substrate as described above, in some examples, food may be applied directly to the platform. In other embodiments, multiple items may be placed and retained on the platform. The pet may engage with combinations of items, such as the items discussed above. For example, the platform may retain a tablet and food, so that the pet may alternate between eating and watching a program displayed on the tablet. Such item combinations may be useful during procedures that require the pet to have limited movement and/or remain in the standing position for longer amounts of time.

While scenarios in FIGS. 1A-1C, depict a human 150 performing a procedure 160 on a pet 140, the systems, devices, and methods of the present disclosure may be used for other purposes in which a procedure (e.g., health or medical procedures and grooming procedures) is not being performed on a pet. Other purposes may include scenarios where it is desirable to confine pet movement without physical restraint, in order to maintain a calming and relaxed environment for the pet. For example, a pet owner may desire to confine their pet's movement and keep the pet in a designated area when a visitor is present. In this scenario, the pet owner may not want to put the pet in a cage. Systems of the present disclosure, such as system 100, may be used as an alternative to cages. System 100 may be used to engage a pet's attention and to confine their movement. As the pet engages with an item retained on the platform before them, such as item 130, the pet will be preoccupied and distracted from moving around.

Figure 2:
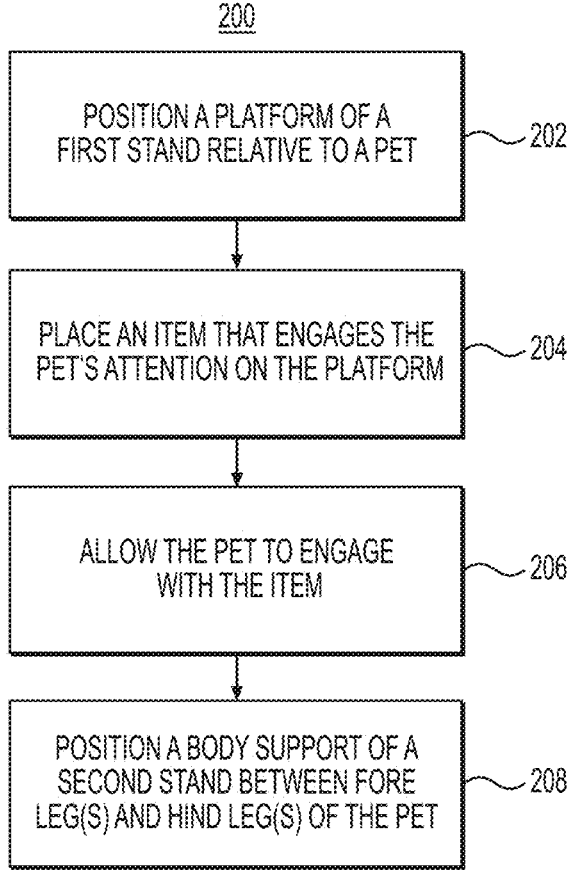
FIG. 2 depicts a flowchart illustrating an exemplary method for confining pet movement without physical restraint, according to one or more embodiments.

FIG. 2 depicts a flowchart illustrating an exemplary method 200 for confining pet movement without physical restraint, using the systems and devices of the disclosure. Method 200 may be performed by at least one of a pet owner, pet care provider, and a veterinarian.

In initial step 202, a user may position a platform of a first stand relative to a pet. Positioning the platform of a first stand relative to a pet may include making adjustments to the platform so that the platform is easily accessible to the pet. Therefore, the size (e.g., height) of the pet may be considered. In some embodiments, the size of the pet when standing on its fore legs and hind legs may be considered. Positioning the platform may include adjusting a hinge mechanism of the first stand, wherein the platform may be rotated or tilted about a point. Such positioning may allow the platform to be rotated or tilted upward or downward relative to the pet (i.e., size of the pet). For example, if the pet is smaller and has a shorter standing height, the platform may be rotated or tilted downward to cause the platform to align with the head level of the pet.

In other embodiments, adjusting an angle or axis of rotation of the platform by rotating or tilting the platform upward or downward may also be performed to aid in manipulating a pet into a particular position when standing. For example, the platform may be tilted upward at various angles to achieve various positions (e.g., a substantially flat position) that cause the pet's neck exposure to be lengthened or extended. Such embodiments may be useful for performing a vaccination procedure.

Positioning the platform may also include adjusting the height of the platform. During platform height adjustment, the platform may be raised or lowered relative to the pet (i.e., size of the pet). In some embodiments, positioning the platform may require adjusting both the rotation of the platform and the height of the platform relative to the pet. Furthermore, adjusting the angle of the platform alone or in combination with adjusting the height of the platform may assist in raising a pet's head up. Such embodiments may be useful for posture correction and/or physiotherapy.

In step 204, an item that engages the pet's attention may be placed on the platform. In step 206, the pet is allowed to engage with the item placed on the platform. A few additional steps may occur between placing the item on the platform in step 204 and allowing the pet to engage with the item in step 206, in order to facilitate pet engagement. For example, if a tablet is placed on the platform, a person will have to configure the tablet for viewing. In these examples, a person may set up the tablet to display digital programming or content designed for the pet (e.g., Cat TV or Dog TV).

In step 208, a body support of a second stand may be positioned between the fore leg(s) and hind leg(s) of the pet. In some embodiments, the second stand comprising the body support may need to be moved closer to the area where the pet is engaging with the item on the platform of the first stand. Once the body support is close to the pet in the standing position, the body support may be positioned between the fore legs and hind legs of the pet. For example, the body support may be placed underneath the pet in a standing position, such that the body support may be parallel to the abdomen of the pet. In some embodiments, positioning the body support between the fore legs and hind legs of the pet may also include adjusting the body support based on the size of the pet. For example, the height of the body support may need to be adjusted based on the height of the pet in the standing position to ensure both adequate support and comfort. In at least one embodiment, the body support may remain at the same height and not be adjustable.

In some embodiments, the method for confining pet movement without physical restraint according to the present disclosure may have a different order of steps, than the order of steps depicted in method 200 of FIG. 2. In certain examples where the pet is already standing still with its fore legs and hind legs touching the ground, an initial step may include positioning a body support of a second stand between the fore legs and hind legs of the pet. Subsequent steps may include positioning a platform of a first stand relative to the pet, placing an item that engages the pet's attention on the platform, and allowing the pet to engage with the item. Alternatively, the subsequent steps may include placing an item that engages the pet's attention on a platform of a first stand, positioning the platform of the first stand relative to the pet, and allowing the pet to engage with the item.

Figure 3A:
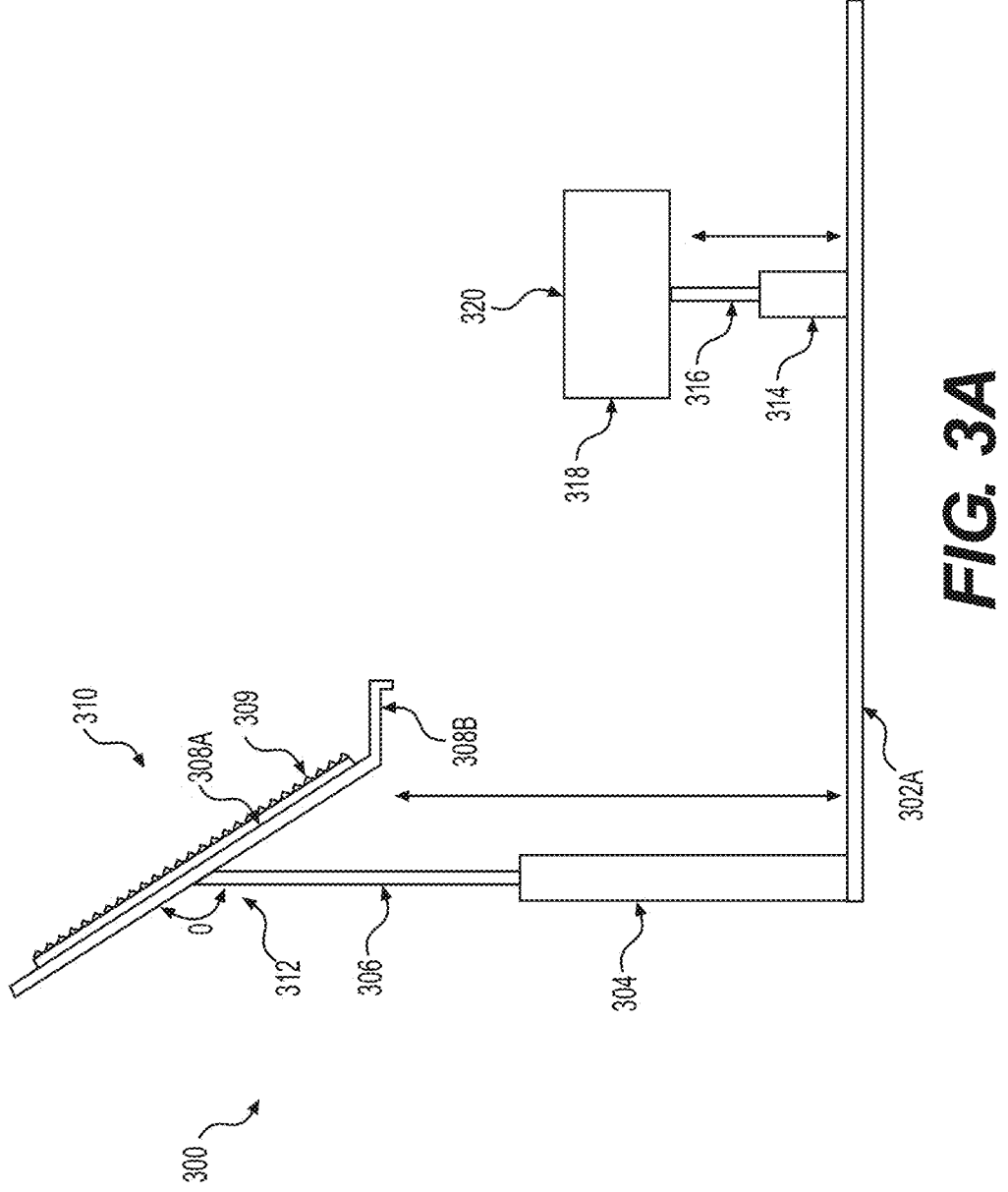
FIG. 3A depicts a side view of an exemplary device for confining pet movement without physical restraint, according to one or more embodiments.

FIG. 3A shows a side view of an exemplary device for confining pet movement without physical restraint of the disclosure. FIG. 3A depicts an embodiment in which device 300 is viewed from the side. Device 300 comprises a first stand 320, a primary base 302A, and a second stand 310. First stand 320 and second stand 310 are each connected to primary base 302A, with a horizontal distance along the primary base 302A between first stand 320 and second stand 310 being adjustable. In some embodiments, at least one of first stand 320 and second stand 310 may be mounted to primary base 302A. For example, one stand may be fixed to base primary 302A, and the other stand may be connected to primary base 302A but movable relative to base 302A. In other embodiments, neither of first stand 320 and second stand 310 are fixed to primary base 302A, and are both connected to and movable relative to primary base 302A. Primary base 302A may be substantially flat. In some examples, primary base 302A may be configured to have a soft surface to be compatible with pets averse to metal or plastic surfaces.

First stand 320 includes an adjustable body support 318, a first middle portion 316, and a first base portion 314. The first middle portion 316 is connected to the adjustable body support 318 at the bottom of the body support and is also connected to the first base portion 314 at the top of the first base portion, forming a middle portion between adjustable body support 318 and first base portion 314. The first base portion 314 of first stand 320 may be connected to primary base 302A.

Adjustable body support 318 may be configured to be positioned between the fore and hind legs of a pet in a standing position and may aid in maintaining the standing position. Adjustable body support 318 may be positioned close to and parallel with the pet's abdomen. Adjustable body support 318 may be substantially flat. In some embodiments, adjustable body support 318 may be adjusted based on the height of the pet. As depicted by the double-sided arrow next to first stand 320, adjustable body support 318 may be configured to move vertically, in the direction of the arrow, based on the height of the pet. Adjustable body support 318 may be adjusted by a height adjustment configuration, such as a sliding configuration. Adjustable body support 318 is shown as being connected to first middle portion 316 and first middle portion 316 is connected to first base portion 314. First middle portion 316 and first base portion 314 may each have a tubular or cylindrical shape and may be concentric. The outer diameter of first middle portion 316 may fit inside the inner diameter of first base portion 314. First middle portion 316 may extend through the inner cylindrical cavity of first base portion 314. For example, the first middle portion 316 and first base portion 314 may have a telescopic configuration and first middle portion 316 may be disposed within first base portion 314 and slidable within the cavity of first base portion 314. As a force is exerted in a downward direction (e.g., pushing down) on either the first middle portion 316 or the adjustable body support 318, the first middle portion 316 may be lowered toward or into first base portion 314, which results in a height adjustment of adjustable body support 318. Alternatively, as a force (e.g., a force less than that which would be required against a gravitational force without the aid of the disclosed sliding mechanism) is exerted in an upward direction (e.g., pulling up) on either the first middle portion 316 or the adjustable body support 318, the first middle portion 316 may be raised or extended in the upward direction away from first base portion 314, which results in a height adjustment of adjustable body support 318.

The first middle portion 316 and the adjustable body support 318 connected thereto may be raised for larger pets and may be lowered for smaller pets. In addition, height of the adjustable body support 318 may be varied, either substantially or slightly. Varying the height of the adjustable body support 318 may ensure that the body support does not tightly press up against and add an uncomfortable pressure to the pet's abdomen and chest. In certain embodiments, adjustable body support 318 may have a soft surface that comes in contact with the pet. Varying the height of the adjustable body support 318 may also ensure that the body support is not so low that it fails to provide support of the body or reinforce the standing position of the pet.

Second stand 310 includes an adjustable platform 308A, a second middle portion 306, and a second base portion 304. The second middle portion 306 is connected to the adjustable platform 308A on the back surface of the adjustable platform 308A. The second middle portion 306 may be connected or attached to adjustable platform 308A at the midsection between opposite ends of the back surface of the adjustable platform 308A. While FIG. 3A depicts the connection between the adjustable platform 308A and second middle portion 306 as being located at the midsection of the back surface of adjustable platform 308A, in other embodiments of the disclosure, the second middle portion 306 may be connected to the adjustable platform 308A at any location on the back surface of the platform. The second middle portion 306 is also connected to the second base portion 304 at the top of the second base portion, forming a middle portion between adjustable platform 308A and second base portion 304. The second base portion 304 of second stand 310 may be connected to primary base 302A.

Adjustable platform 308A may be configured to retain or hold an item that engages pet attention. Adjustable platform 308A may be adjusted based on the height of the pet, so that the pet is capable of engaging with the item or items retained on the platform. In other words, in some embodiments, the adjustable platform 308A must not be so high that smaller sized pets, even when in the standing position, are unable to reach or engage with the platform. The adjustable platform 308A must also not be so low that it is unnatural for larger sized pets to engage with the platform.

As depicted by the double-sided arrow next to second stand 310, adjustable platform 308A may be configured to move vertically, in the direction of the arrow, based on the height of the pet. Adjustable platform 308A may be adjusted by a height adjustment configuration, such as a sliding configuration. Adjustable platform 308A is shown as being connected to second middle portion 306 and second middle portion 306 is connected to second base portion 304. Second middle portion 306 and second base portion 304 may each have a tubular or cylindrical shape and may be concentric. The outer diameter of second middle portion 306 may fit inside the inner diameter of second base portion 304. Second middle portion 306 may extend through the inner cylindrical cavity of second base portion 304. For example, the second middle portion 306 and second base portion 304 may have a telescopic configuration and second middle portion 306 may be disposed within second base portion 304 and slidable within the cavity of second base portion 304. As a force is exerted in a downward direction (e.g., pushing down) on either the second middle portion 306 or the adjustable platform 308A, the second middle portion 306 may be lowered toward or into second base portion 304, which results in a height adjustment of adjustable body support 308A. Alternatively, as a force (e.g., a force less than that which would be required against a gravitational force without the aid of the disclosed sliding mechanism) is exerted in an upward direction (e.g., pulling up) on either the second middle portion 306 or the adjustable platform 308A, the second middle portion 306 may be raised or extended in the upward direction away from second base portion 304, which results in a height adjustment of adjustable platform 308A. Further, while FIG. 3A depicts second stand 310 and first stand 320 as having different heights, such that second stand 310 is substantially higher than first stand 320, the height adjustment mechanisms as discussed above allow for various height configurations. In some examples, first stand 320 may be higher than second stand 310 and in other examples, first stand 320 and second stand 310 may be at the same level.

In addition to adjusting the height of adjustable platform 308A, the orientation or positioning of the platform may be adjusted by rotating or tilting the platform about a point or an axis. The back surface of the adjustable platform 308A may be connected to second middle portion 306 at an angle 312. Adjustment means may be provided to allow the adjustable platform 308A to be set at a preferred angle at angle 312 relative to the second middle portion 306. Suitable adjustment means for rotating or tilting the adjustable platform 308A relative to second middle portion 306 and second base portion 304 beneath according to the present disclosure, includes hinge mechanisms, pivot mechanisms, ball and socket mechanisms, and the like. In some embodiments, the adjustable platform 308A may be pivotally attached to the second middle portion 306, so as to be rotatable or tiltable at an angle, angle 312, relative to the second middle portion 306. In at least one example, a ball and socket connection may be formed between the back surface of the adjustable platform 308A and the second middle portion 306, to allow the adjustable platform 308A to rotate at various angles. In some embodiments, a hinge mechanism may be used to tilt adjustable platform 308A about a 180° arc at angle 312 until a desired angle is selected.

In certain embodiments, only the height of the adjustable platform 308A may need to be adjusted in a vertical direction. In some embodiments, only the angle of the adjustable platform 308A may need to be adjusted. Further, in some embodiments, both the height and the angle of the adjustable platform 308A may need to be adjusted. Rotating or tilting the adjustable platform 308A to a desired angle and adjusting the height may ensure that the platform and the item it retains is at a level and an orientation that is accessible to the pet and comfortable for pet engagement. In at least one aspect of the disclosure, adjustable platform 308A may be at a fixed angle relative to second middle portion 306 and non-rotatable.

In addition to the adjustable platform 308A having a back surface, the adjustable platform 308A also has a front surface or first surface that may be configured to retain or hold an item for pet engagement. Adjustable platform 308A may have a textured surface 309, as the surface that retains the item for pet engagement. Textured surface 309 may be rough and include raised patterns. Textured surface 309 may also contain crevices or indentations. The textured surface 309 of adjustable platform 308A may provide suitable friction and/or adhesion for retaining an item or items for pet engagement and may ensure that the items do not easily slip off of the platform. In some embodiments, textured surface 309 may be capable of retaining food for a pet. For example, certain types of spreadable food (e.g. tuna, pate, peanut butter, and semi moist pet foods) may be spread directly onto textured surface 309 and retained within the indentations and crevices present. The pet may lick textured surface 309. In certain embodiments, the textured surface 309 may be detachable from the adjustable platform 308A. It may be desirable to remove textured surface 309 to apply food and then reattach textured surface 309 for pet consumption. It may also be desirable to remove textured surface 309 in order to clean it when food has been applied or to replace it with another clean textured surface 309. As an example, the removable textured surface 309 may be in the form of a removable mat with a textured surface. In some embodiments, the textured surface 309 may be removed from adjustable platform 308A so that non-edible items may be retained.

Given that the adjustable platform 308A may be configured to be rotated or tilted at various angles, in certain embodiments the adjustable platform 308A may be rotated or tilted so that the back surface of the adjustable platform is accessible to the pet. In other words, in some embodiments, adjustable platform 308A may be flipped upward. Thus, in at least one embodiment textured surface 309 may be included on at least a portion of the back surface of adjustable platform 308A. It may be desirable for textured surface 309 to be included on the back surface of adjustable platform 308A, in examples where food is spread on textured surface 309, so that the pet may lick the textured surface and continue engaging with adjustable platform 308A, even when the platform is tilted upward and above the head level of certain pets.

While the adjustable platform 308A for device 300 is depicted with a textured surface 309, in some aspects of the disclosure adjustable platform 308A may have a smooth, non-textured surface configured to retain items for pet engagement. In certain embodiments, the front surface of adjustable platform 308A configured to retain items may include at least one retaining agent. The at least one retaining agent may be disposed on the front surface for retaining items and may be configured to retain an item or items placed on the front surface of the adjustable platform. Exemplary retaining agents may include one or more magnetic elements, one or more adhesives, one or more prongs, and one or more gripping elements. In examples where the retaining agent is one or more magnetic elements, magnetic elements (e.g., magnets) may be disposed on and adhered to the surface of the adjustable platform for retaining an item. Additional magnetic elements may be provided to attach to the back of an item for pet engagement, such as an electronic device. When the item is placed on the surface of the adjustable platform, it may be retained via magnetic attraction.

Similarly, other retaining agents, such as adhesives, prongs, and gripping elements (e.g., Velcro), may be disposed on the front surface of the adjustable platform for retaining items for pet engagement. These retaining agents may be used to secure the item to the surface of the adjustable platform and assist with holding the item in place. Other means may be used to help retain or hold the item for pet engagement in place on the adjustable platform.

In FIG. 3A, adjustable platform 308A of second stand 310 includes item support portion 308B. Item support portion 308B may be configured to support an item for pet engagement that is placed on or against the front surface of adjustable platform 308A. For example, when an item is placed against textured surface 309, the item may rest on and be supported by item support portion 308B. Item support portion 308B may serve as a ledge, which is substantially flat. Item support 308B may be a direct extension of adjustable platform 308A. Item support 308B projects outward from adjustable platform 308A, in a direction that is parallel with the horizontal direction of primary base 302A, as shown in FIG. 3A. An angle such as a perpendicular angle or an obtuse angle, may be formed between the front surface of adjustable platform 308A or textured surface 309 and item support portion 308B. For example, item support portion 308B may be formed at a bottom edge of the adjustable platform 308A at an angle relative to a remaining portion of adjustable platform 308A. Item support 308B may project out from the front surface of adjustable platform 308A at a length or depth that is capable of holding a variety of items with different thicknesses. Item support portion 308B may also extend across and be transverse with the entire length of the bottom portion of adjustable platform 308A. For example, a planar surface of item support portion 308B may be oriented transversely to a planar surface of a remaining portion of adjustable platform 308A.

Various other configurations of the adjustable platform 308A and the item support portion 308B are envisioned by the present disclosure. In some embodiments, the angle between the front surface of the adjustable platform 308A and the item support portion 308B may be approximately 90 degrees. When viewed from the side, the adjustable platform 308A and the item support 308B, which projects outward from the adjustable platform 308A, may have an L shape. In other embodiments, the item support portion 308B may only extend across a portion of the front surface of the adjustable platform 308A. The item support portion 308B may also be attached to the front surface of the adjustable platform 308A at locations other than along the bottom edge. In certain embodiments, item support portion 308B may be detachable from adjustable platform 308A. Further, in at least one embodiment, device 300 only contains adjustable platform 308A without an item support portion 308B.

Figure 3B:
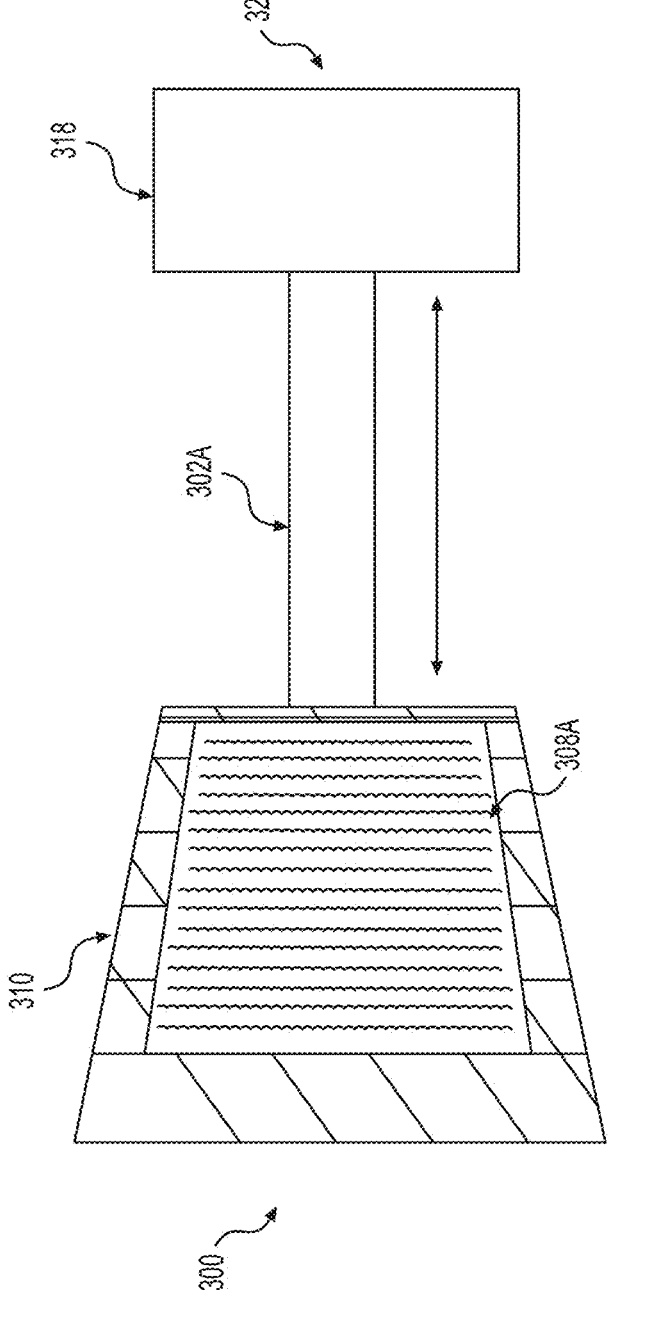
FIG. 3B depicts a bird's eye view of an exemplary device for confining pet movement without physical restraint, according to one or more embodiments.

FIG. 3B depicts a bird's eye view of device 300 as discussed above. In particular, FIG. 3B shows how the first stand 320 comprising adjustable body support 318 and the second stand 310 comprising adjustable platform 308A may move along the longitudinal axis of primary base 302A. At least one of the first stand 320 and the second stand 310 of device 300, may be configured to move across primary base 302A in a horizontal direction when viewed from above (e.g., in the view being illustrated in FIG. 3B). In real life, at least one of the first stand 320 and the second stand 310 of device 300 would be configured to move laterally along the longitudinal axis of primary base 302A. The primary base 302A may include a track. The track may extend along at least a portion of a longitudinal axis of primary base 302A. In some embodiments, the track may extend approximately from one end of primary base 302A to the opposite end of primary base 302A. The track may be located between first stand 320 and second stand 310. The track may be embedded in primary base 302A along the longitudinal axis or the track may be attached directly to the surface of primary base 302A along the longitudinal axis.

The first base portion 314 of first stand 320 may be configured to interface with the track of primary base 302A and may be configured to move along the track of primary base 302A in the horizontal direction. Such movement as facilitated by the track mechanism may allow the distance between the first stand 320 and the second stand 310 to be adjusted. In some embodiments, the second base portion 304 of first stand 320 may be configured to interface with the track of primary base 302A and may be configured to move along the track of primary base 302A in the horizontal direction. When viewed from above, adjustable body support 318 of the first stand 320 may be shown as moving toward adjustable platform 308A of the second stand 310 or away from adjustable platform 308A of the second stand 310. Similarly, when viewed from above, adjustable platform 308A of the second stand 310 may be shown as moving toward adjustable body support 318 of the first stand 320 or away from adjustable body support 318 of the first stand 320. In some embodiments where the first base portion 314 of first stand 320 and/or the second base portion 304 of the second stand 310 are configured to interface with and move along the track of primary base 302A, the movement may occur via sliding or rolling across the track.

In an example where adjustable body support 318 is already positioned between the fore legs and hind legs of a pet in a standing position, the second stand 310 comprising adjustable platform 308A may be moved across the track along the longitudinal axis of primary base 302A toward the pet and the first stand 320, so as to bring the second stand 310 comprising the adjustable platform 308A closer to the pet. Alternatively, the track along the longitudinal axis of primary base 302A may be used to move the second stand 310 comprising adjustable platform 308A away from the pet and the first stand 320, if it is too close. In scenarios where it is no longer necessary to confine the movement of the pet, the track along the longitudinal axis of primary base 302A may be used to move the second stand 310 comprising adjustable platform 308A away from the pet and the first stand 320, in order to stop the pet from engaging with the item retained on the adjustable platform 308A.

In another example where a pet is already engaged with an item retained on adjustable platform 308A, but the adjustable body support 318 is not positioned underneath the pet, the track along the longitudinal axis of primary base 302A may be used to bring the first stand 320 comprising the adjustable body support 318 closer to the pet, so that the adjustable body support 318 may be positioned between the fore legs and hind legs of the pet and so that the first stand 320 may align with the second stand 310.

While an exemplary mechanism for moving the first stand and the second stand across the base of the device is a track mechanism, other mechanisms for moving objects attached to a base across the base in various directions may also be used. Further, in some embodiments, primary base 302A may be configured to have more than one track.

Figure 3C:
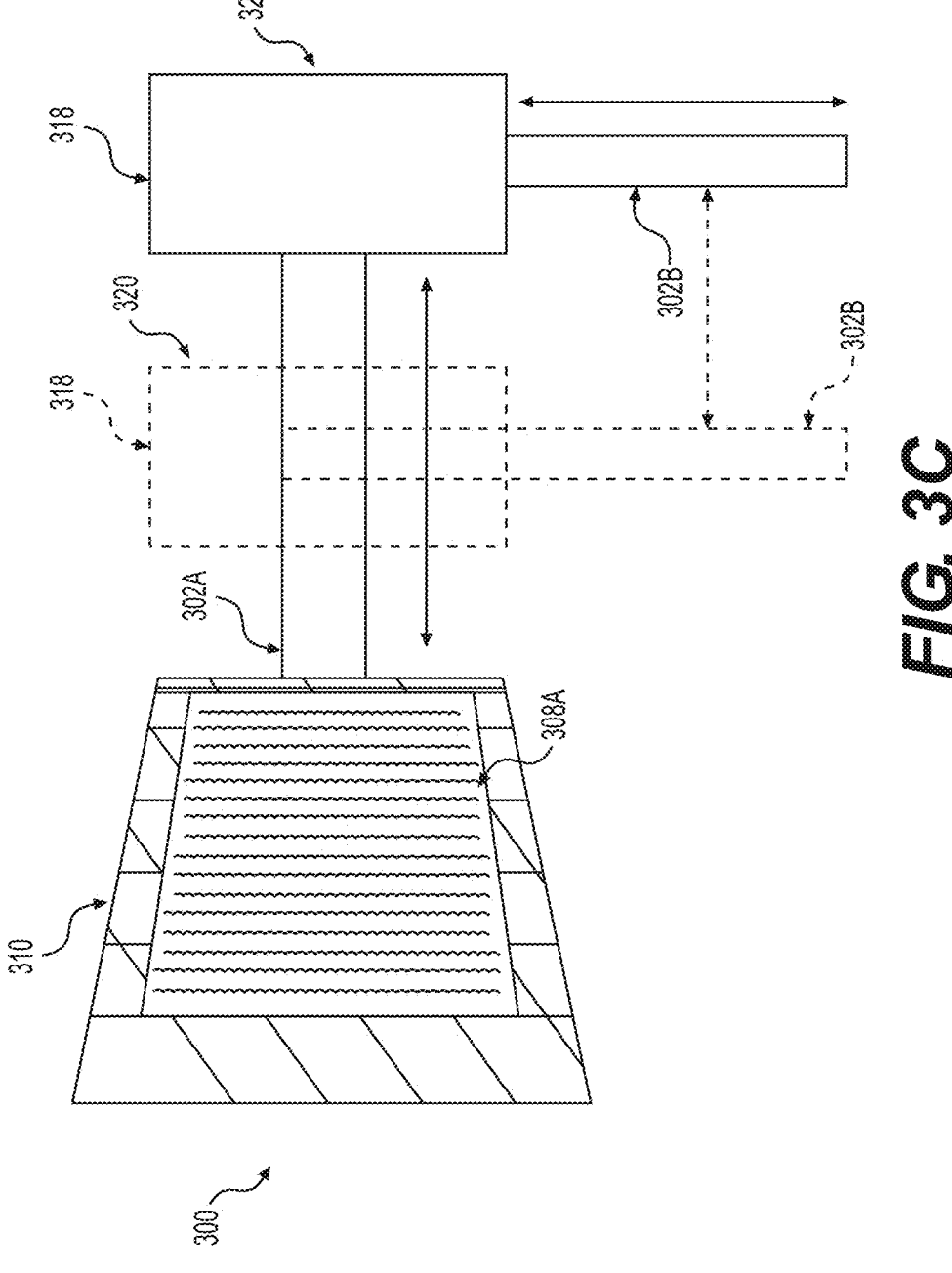
FIG. 3C depicts another bird's eye view of an exemplary device for confining pet movement without physical restraint, according to one or more embodiments.

FIG. 3C depicts a bird's eye view of device 300 as discussed above. In particular, FIG. 3C shows how the first stand 320 comprising adjustable body support 318 may be positioned along the longitudinal axis of the primary base 302A, and may move along another axis which is transverse or orthogonal to the longitudinal axis of the primary base 302A. The portion of primary base 302A which is transverse or orthogonal to the longitudinal axis of the primary base 302A will be referred to herein as auxiliary base 302B. In FIG. 3C, because it is a bird's eye view of device 300, the first stand 320 and the second stand 310 are shown to move "laterally" or "horizontally" to depict their movement along the longitudinal axis of the primary base 302A, and the first stand 320 is shown to move "vertically" to depict its movement along the axis that is transverse or orthogonal to the longitudinal axis of the primary base 302A. In the current disclosure, the axis that is transverse or orthogonal to the longitudinal axis of the primary base 302A will be referred to as a transverse axis for brevity. Auxiliary base 302B, which is approximately perpendicular to primary base 302A in the bird's eye view of FIG. 3C, may support the movement of the first stand 320 along the transverse axis. In the current disclosure, the direction in which the first stand 320 moves along auxiliary base 302B will be referred to as a transverse direction, and the movement of the first stand 320 in the transverse direction will be referred to as a transverse movement. In addition to being configured to move vertically, adjustable body support 318 of the first stand 320, or the first stand 320, may also be configured to move along auxiliary base 302B in a transverse direction relative to primary base 302A. When viewed from above, adjustable body support 318 may move up and down along auxiliary base 302B. In order to facilitate the transverse movement of the adjustable body support 318 (i.e., first stand 320), the adjustable body support 318 may also be configured to move via a track mechanism embedded in the auxiliary base 302B. Other mechanisms for moving an object in the transverse direction may also be used for the adjustable body support of the disclosure.

Furthermore, auxiliary base 302B may be connected or coupled to primary base 302A in such a way that the entirety of auxiliary base 302B may move in a direction that is parallel to the longitudinal axis of primary base 302A, while maintaining the orthogonality with primary base 302A. For example, a top end of auxiliary base 302B (when viewed from the top of device 300) may be connected or coupled to primary base 302A in a manner that allows the entirety of auxiliary base 302B to move laterally relative to the longitudinal axis of primary base 302A. Such lateral movement is illustrated by the dotted arrow in FIG. 3C. Therefore, the base configuration depicted in FIG. 3C allows the adjustable body support 318 to move in a transverse direction along auxiliary base 302B (e.g., via a track mechanism), and to move along the direction that is parallel to the longitudinal axis of primary base 302A.

The configuration illustrated in FIG. 3C allows the adjustable body support 318 to be "moved out of the way" when initially positioning or attracting the pet toward the adjustable platform 308A. In other words, using auxiliary base 302B, the adjustable body support 318 may be moved away when the pet approaches the adjustable platform 308 by moving it "down" along the auxiliary base 302B when viewed from the top (e.g., FIG. 3C). Then, once the pet is positioned in an ideal or a preferred location, the lateral position of the auxiliary base 302B may first be adjusted by moving the entirety of the auxiliary base 302B to be in alignment with the abdomen area of the pet (e.g., the area between fore and hind legs). Once the auxiliary base 302B has been aligned with the abdomen area of the pet, the auxiliary base 302B may be slid underneath the abdomen area by moving it "up" along the auxiliary base 302B when viewed from the top (e.g., FIG. 3C). The movement of adjustable body support 318 along auxiliary base 302B (e.g., up and down movements when viewed from above) as well as the movement of the entirety of the auxiliary base 302B according to the preceding description is shown in FIG. 3C through the hatched line depictions of first stand 320 containing adjustable body support 318 and auxiliary base 302B.

In another embodiment, the adjustable body support 318 may be configured to move in a direction that is orthogonal to a longitudinal axis of the first middle portion 316 to which it is connected, or in a direction that is parallel to the longitudinal axis of the primary base 302A. For example, a tracking mechanism may be implemented on the bottom surface of adjustable body support 318 around the area where adjustable body support 318 connects with the first middle portion 316, in order to facilitate movement in the desired direction. This configuration may allow for slight movements and adjustments of the adjustable body support 318 in various directions when viewed from above (e.g., back and forth or front and back) relative to primary base 302A. Such slight or minor adjustments may be useful to shift support of the adjustable body support 318 when it is already positioned underneath a pet in the standing position. For example, some pets may require more support near their hind legs when standing and some pets may require more support near their fore legs when standing.

In the embodiments of the disclosure where a track mechanism is used to move various components of the device, the components may be moved manually (e.g., pushing). In some embodiments, the track movement may be powered by a motor.

While FIGS. 1A-1C and FIGS. 3A-3C depict systems and devices of the disclosure as unitary, the method as described above in reference to FIG. 2 may also be carried out with systems comprising separate components. For example, in method 200, the first stand and the second stand may have the same functions as discussed above, but be completely separate and not mounted or connected to a shared base component that forms a unitary device.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A system for confining pet movement, the system comprising:
    a first stand comprising an adjustable body support, a first middle portion, and a first base portion, the first middle portion configured to move the adjustable body support vertically based on a height of a pet;
    a second stand comprising an adjustable platform, a second middle portion, and a second base portion, the second middle portion configured to move the adjustable platform vertically based on the height of the pet, the adjustable platform configured to retain an item that is placed on a first surface of the adjustable platform; and
    a base onto which the first stand and the second stand are mounted,
    wherein the system comprising the first stand, the second stand, and the base confines the pet movement without any physical restraint.

2. The system of claim 1, wherein the item is a toy, an electronic device, food, a feeding substrate, or a combination thereof.

3. The system of claim 2, wherein the feeding substrate comprises a mat configured to retain food.

4. The system of claim 1, wherein the adjustable platform comprises an item support portion configured to support an item placed on the first surface of the adjustable platform.

5. The system of claim 4, wherein a planar surface of the item support portion is oriented transversely to a planar surface of a remaining portion of the adjustable platform.

6. The system of claim 4, wherein the item support portion is formed at a bottom edge of the adjustable platform at an angle relative to a remaining portion of the adjustable platform.

7. The system of claim 1, wherein the first surface of the adjustable platform is textured.

8. The system of claim 1, wherein the first surface of the adjustable platform comprises at least one retaining agent disposed on said first surface, the at least one retaining agent configured to retain an item placed on the first surface of the adjustable platform.

9. The system of claim 8, wherein the at least one retaining agent comprises one or more magnetic elements, one or more adhesives, one or more straps, one or more prongs, or one or more gripping elements.

10. The system of claim 1, wherein the first stand, the second stand, and the base form a unitary device.

11. The system of claim 1, wherein the adjustable platform is configured to rotate or tilt about a point at which the adjustable platform and second middle portion meet.

12. The system of claim 11, wherein the adjustable platform is configured to rotate or tilt using a hinge mechanism.

13. The system of claim 1, wherein the first middle portion is coupled to the first base portion and configured to move vertically relative to the first base portion using a sliding configuration for height adjustment of the adjustable body support and wherein the second middle portion is coupled to the second base portion and configured to move vertically relative to the second base portion using a sliding configuration for height adjustment of the adjustable platform.

14. The system of claim 1, wherein the adjustable body support is configured to be placed underneath a pet in a standing position and to maintain said standing position of the pet while a health related procedure or a grooming procedure is performed on the pet.

15. A device for confining pet movement, the device comprising:
    a base;
    a first stand connected to the base; and
    a second stand connected to the base;
    wherein the first stand comprises a first base portion that connects the first stand to the base and a body support portion configured to be positioned between fore and hind legs of a pet in a standing position;
    wherein the second stand comprises a second base portion that connects the second stand to the base and a platform configured to hold an item that engages attention of the pet, and
    wherein the device comprising the base, the first stand, and the second stand confines the pet movement without any physical restraint.

16. The device of claim 15, wherein the first stand further comprises a first middle portion located between the body support portion and the first base portion, wherein the first middle portion of the first stand is movable in a vertical direction and configured to adjust a height of the body support;
    wherein the first base portion of the first stand is configured to move along a longitudinal axis of the base in a horizontal direction; and
    wherein the second stand further comprises a second middle portion located between the platform and the second base portion, wherein the second middle portion of the second stand is movable in a vertical direction and configured to adjust a height of the platform.

17. The device of claim 16, wherein the second base portion of the second stand is configured to move along a longitudinal axis of the base in a horizontal direction.

18. The device of claim 16, wherein a connection between the second middle portion and the platform of the second stand is configured for angle adjustment of the platform and wherein the platform has a textured surface configured to retain food.

19. The device of claim 16, wherein the body support is configured to move in a direction that is orthogonal to a longitudinal axis of the first middle portion or in a direction that is parallel to a longitudinal axis of the base.

20. The device of claim 15, wherein the base comprises a base track extending along at least a portion of a longitudinal axis of the base, wherein each of the first base portion of the first stand and the second base portion of the second stand is configured to interface with the base track, and wherein each of the first base portion of the first stand and the second base portion of the second stand is configured to move along the base track to adjust a distance between the first stand and the second stand.

* * * * *